(12) United States Patent
Mine

(10) Patent No.: US 8,346,320 B2
(45) Date of Patent: Jan. 1, 2013

(54) SLIDING STRUCTURE FOR HOUSING, SLIDING OPENING AND CLOSING HOUSING, AND MOBILE PHONE

(75) Inventor: Takashi Mine, Tokyo (JP)

(73) Assignee: NEC Corporation, Tokyo (JP)

( * ) Notice: Subject to any disclaimer, the term of this patent is extended or adjusted under 35 U.S.C. 154(b) by 659 days.

(21) Appl. No.: 12/528,018

(22) PCT Filed: Feb. 21, 2008

(86) PCT No.: PCT/JP2008/052936
§ 371 (c)(1),
(2), (4) Date: Aug. 20, 2009

(87) PCT Pub. No.: WO2008/117597
PCT Pub. Date: Oct. 2, 2008

(65) Prior Publication Data
US 2010/0035670 A1 Feb. 11, 2010

(30) Foreign Application Priority Data
Mar. 23, 2007 (JP) ................................. 2007-075781

(51) Int. Cl.
*H04B 1/38* (2006.01)
*H04B 1/08* (2006.01)
*H04M 1/00* (2006.01)

(52) U.S. Cl. ................. 455/575.3; 455/575.1; 455/90.1; 455/550.1; 455/347

(58) Field of Classification Search ............... 455/575.1, 455/575.4, 90.1, 90.3, 550.1, 575.3, 347
See application file for complete search history.

(56) References Cited

U.S. PATENT DOCUMENTS

| | | | | |
|---|---|---|---|---|
| 5,956,625 A | * | 9/1999 | Hansen et al. | 455/575.4 |
| 6,073,027 A | * | 6/2000 | Norman et al. | 455/575.4 |
| 6,282,436 B1 | * | 8/2001 | Crisp | 455/575.4 |
| 6,463,262 B1 | * | 10/2002 | Johnson et al. | 455/90.1 |
| 6,785,565 B2 | * | 8/2004 | Gventer | 455/575.4 |
| 6,842,626 B1 | * | 1/2005 | Inoue et al. | 455/550.1 |

(Continued)

FOREIGN PATENT DOCUMENTS

| | | |
|---|---|---|
| JP | 2004320549 A | 11/2004 |
| JP | 2006186201 A | 7/2006 |
| JP | 2006333079 A | 12/2006 |

OTHER PUBLICATIONS

International Search Report for PCT/JP2008/052936 mailed Mar. 25, 2008.

*Primary Examiner* — Tilahun B Gesesse

(57) ABSTRACT

A sliding structure includes a guide rail formed on a first housing, a groove for the guide rail formed on a second housing, wherein the first housing and the second housing can engage each other and slide, an elastic body that expands and contracts in a longitudinal direction of the guide rail in parallel with the guide rail, and two pressing members that are located on ends of the elastic body and subjected to opposite pressing forces from the elastic body, are provided in the groove, at least one-by-one notch is formed on each elastic-body-disposed side of the guide rail and the groove for the guide rail such that the notches can be opposed to each other in a sliding action process, and the two pressing members can take such positions that the pressing members press respective different housings in opposite directions through the notches.

15 Claims, 19 Drawing Sheets

U.S. PATENT DOCUMENTS

| | | | |
|---|---|---|---|
| 7,437,186 B2* | 10/2008 | Park | 455/575.4 |
| 7,450,968 B2* | 11/2008 | Jung | 455/566 |
| 7,953,464 B2* | 5/2011 | Park et al. | 455/575.4 |
| 8,032,193 B2* | 10/2011 | Xin et al. | 455/575.4 |
| 2004/0254000 A1* | 12/2004 | Chen | 455/575.3 |

* cited by examiner

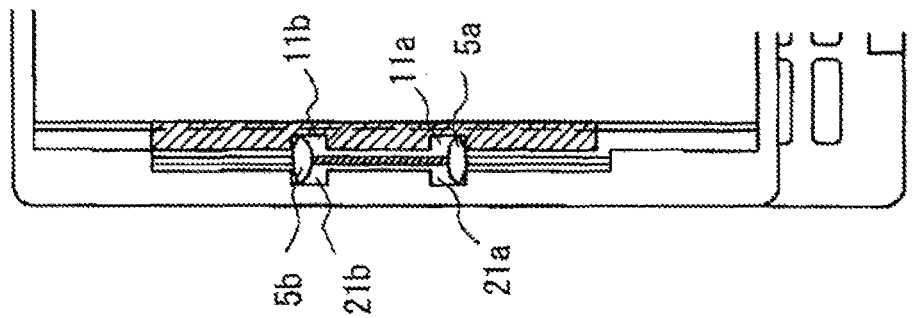
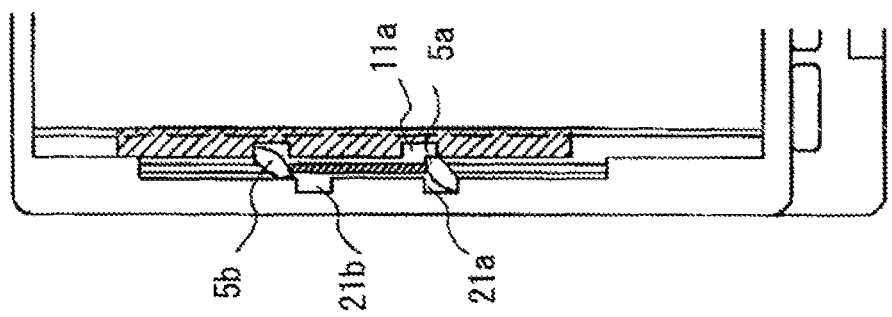
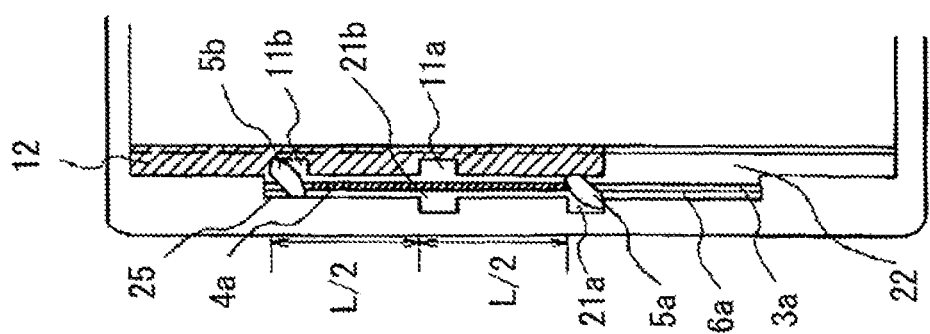

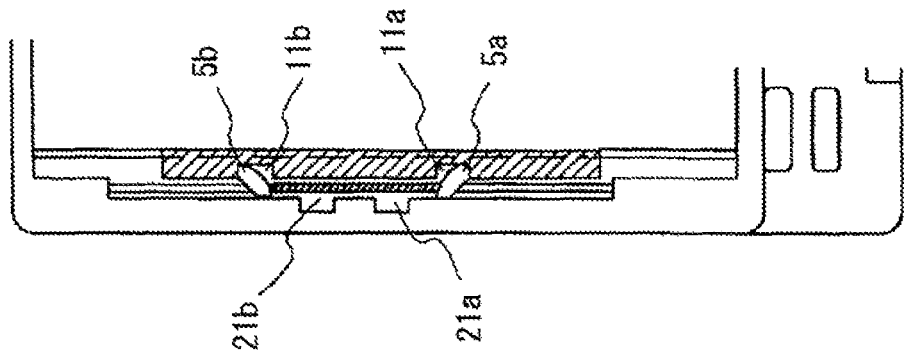
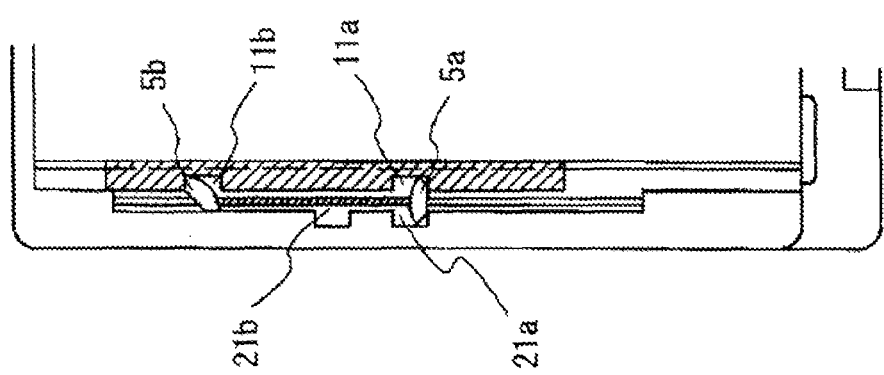
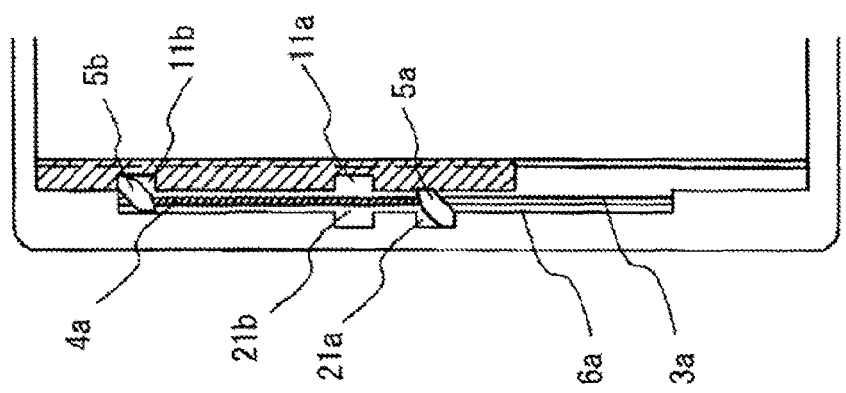

SLIDING STRUCTURE FOR HOUSING, SLIDING OPENING AND CLOSING HOUSING, AND MOBILE PHONE

This application is the National Phase of PCT/JP2008/052936, filed Feb. 21, 2008, which is based upon and claims priority from Japanese Patent Application No. 2007-075781 filed Mar. 23, 2007.

TECHNICAL FIELD

The present invention relates to a sliding structure that is used by sliding a first housing with respect to a second housing and used in, for example, a mobile phone, and a sliding opening-and-closing housing and a mobile phone equipped with the sliding structure.

BACKGROUND ART

As mobile phones have become more sophisticated, mobile phones in which the housing is composed of two parts in order to arrange various components have become the mainstream. In such mobile phones in which the housing is composed of two parts, they are held in a state where one housing is placed on top of the other housing when they are in a standby status, and then desired components are exposed by opening one of the housings when they are used. One of the opening methods for these housings is a semiautomatic sliding method. In a mobile phone using a semiautomatic sliding method, when sliding of the housing is manually performed to a certain position, the housing is automatically slid to a predefined state even if the hand is taken off the slide, and thus providing enhanced usability. In general, a sprig is used for this semiautomatic sliding method. Patent document 1 has realized a semiautomatic sliding structure by guiding both ends of a helical spring provided on the upper housing along a straight guide rail and a convex-shaped guide rail provided on the lower housing. In the mobile phone of Patent document 1, after the housing is slid manually so that one end of the helical spring is moved to the crest of the convex-shaped guide rail while the helical spring is expanded, the housing is automatically slid to a predefined position by using the contracting force of the helical spring even if the hand is taken off the housing.
[Patent Document 1]
Japanese Unexamined Patent Publication Application No. 2006-186201

DISCLOSURE OF INVENTION

Technical Problems

On the other hand, downsizing and reduction in weight, in addition to the sophistication, have been also desired in the mobile phones. The desire for downsizing and reduction in weight is more stringent for a mobile phone composed of two housings. In the case of the above-described semiautomatic sliding method, it is necessary to provide space in the central portion of a housing so that the helical spring can be expanded and contracted, and thus making the downsizing more difficult.

The present invention has been made in view of the above-mentioned problem, and an object of the present invention is to provide a slide mechanism for a semiautomatic housing capable of saving space and coping with downsizing and reduction in weight.

Technical Solution

To achieve the above-mentioned object, a first housing sliding structure in accordance with the present invention is a sliding structure for a housing in which a guide rail formed on a first housing and a groove for a guide rail formed on a second housing engage and slide. An elastic body that expands and contracts in a longitudinal direction of the guide rail and two pressing members that are located on both ends of the elastic body and subjected to respective opposite pressing forces from the elastic body are provided in parallel with the guide rail in the groove for a guide rail of this slide mechanism for a housing, and at least one notch is formed on the elastic-body-disposed side of each of the guide rail and the groove for a guide rail in such a position that they can be opposed to each other in a sliding action process. The two pressing members can take such positions that they press respective different housings in opposite directions through the notches, and the pressing members change their angles by passing through a position where the notches are opposed to each other in the sliding action process, and thereby pressing different housings from the ones that they have pressed up to that moment.

Note that the pressing member preferably includes a first pressing portion that transfers a pressing force of the elastic body to a notch on a side of the guide rail when the pressing member is at a first angle, and a second pressing portion that transfers the pressing force of the elastic body to a notch on a side of the groove for a guide rail when the pressing member is at a second angle. Furthermore, a shaft body to be inserted through the elastic body and the pressing members is preferably provided in the groove for a guide rail, and the pressing member is preferably equipped with an insertion hole that allows the shaft body to pass therethrough but does not allow the elastic body to pass therethrough.

Furthermore, to achieve the above-mentioned object, a second housing sliding structure in accordance with the present invention includes an elastic body and two pressing members both of which are provided in a guide rail formed by a first housing and a second housing. The elastic body expands and contracts in a longitudinal direction of the guide rail, and the two pressing members are located on both ends of the elastic body and subjected to respective opposite pressing forces from the elastic body. At least one notch is formed on the guide groove side of each of the first housing and the second housing in such a position that they can be opposed to each other in a sliding action process, and the two pressing members can take such positions that they press respective different housings in opposite directions through the notches, and the pressing members change their angles by passing through a position where the notches are opposed to each other in the sliding action process, and thereby pressing different housings from the ones that they have pressed up to that moment.

Advantageous Effects

In a sliding structure for a housing in accordance with the present invention, the two pressing members can take such positions that they press respective different housings in opposite directions through the notches, and the pressing members change their angles by passing through a position where the notches are opposed to each other in the sliding action process, and thereby pressing different housings from the ones that they have pressed up to that moment. That is, a direction in which a housing is pressed is reversed in the slide action process. By applying this slide mechanism for a housing to, for example, a mobile phone, it is possible to transform a force that is applied in the closing direction of the upper housing until some midpoint of the sliding into a force that is applied in the opening direction of the upper housing at the midpoint of the sliding.

This slide mechanism for a housing can be achieved by a simple structure, i.e., an elastic body, two pressing members that are subjected to opposite pressing forces from this elastic body, and at least two notches located on the side on which the elastic body is disposed, and thus enabling to achieve downsizing and reduction in thickness and weight of the apparatus as a whole. Furthermore, it requires only a structure in which an elastic body and pressing members move between a notch on the side of the guide rail and a notch on the side of the groove for a guide rail, and does not require a helical spring or a slide stopping mechanism disposed in the central portion of the apparatus that are necessary in conventional semiautomatic sliding structures. Therefore, it does not narrow mounting space for other components and imposes little restriction on electrical wiring between the upper and lower housings, thus improving reliability of wiring connection such as durability against repetitive sliding actions.

BRIEF DESCRIPTION OF DRAWINGS

FIG. 7A is an exploded front view showing a sliding process of a mobile phone 100 equipped with a sliding structure for a housing in accordance with a first exemplary embodiment of the present invention;

FIG. 7B is an exploded front view showing a sliding process of a mobile phone 100 equipped with a sliding structure for a housing in accordance with a first exemplary embodiment of the present invention;

FIG. 7C is an exploded front view showing a sliding process of a mobile phone 100 equipped with a sliding structure for a housing in accordance with a first exemplary embodiment of the present invention;

FIG. 8A is an exploded front view showing a sliding process of a mobile phone 100 equipped with a sliding structure for a housing in accordance with a second exemplary embodiment of the present invention;

FIG. 8B is an exploded front view showing a sliding process of a mobile phone 100 equipped with a sliding structure for a housing in accordance with a second exemplary embodiment of the present invention;

FIG. 8C is an exploded front view showing a sliding process of a mobile phone 100 equipped with a sliding structure for a housing in accordance with a second exemplary embodiment of the present invention;

EXPLANATION OF REFERENCE

100 MOBILE PHONE
1 LOWER HOUSING
2 UPPER HOUSING
3, 3a, 3b SHAFT
4, 4a, 4b SPRING
5, 5a, 5b, 5c, 5d LOCK MEMBER
6, 6a, 6b GROOVE FOR ARRANGING A LOCK MEMBER
10 FRONT-SURFACE HOUSING OF A LOWER HOUSING
11, 11a, 11b, 11c, 11d NOTCH
12 GUIDE RAIL
13 MANIPULATION PORTION
20 BACK-SURFACE HOUSING OF AN UPPER HOUSING
21, 21a, 21b, 21c, 21d NOTCH
22 GROOVE FOR A GUIDE RAIL
23 DISPLAY PORTION
24 STEP PORTION
25 ENGAGING WALL
26 FIXING MEMBER
27 SCREW
30, 30a, 30b SLIDING STRUCTURE
40 BASE
41 DIAL
42a, 42b NOTCH
43a, 43b NOTCH
44 STOPPER
45a, 45b ENGAGING WALL
46 GUIDE GROOVE
51 BOTTOM SURFACE
52, 52a, 53b VERTICAL-SIDE SURFACE
53, 53a, 53b SLANTED SURFACE
54 INSERTION HOLE
61 STRAIGHT GUIDE RAIL
62 CONVEX-SHAPE GUIDE RAIL
63 HELICAL SPRING

BEST MODES FOR CARRYING OUT THE INVENTION

Figure 1A:
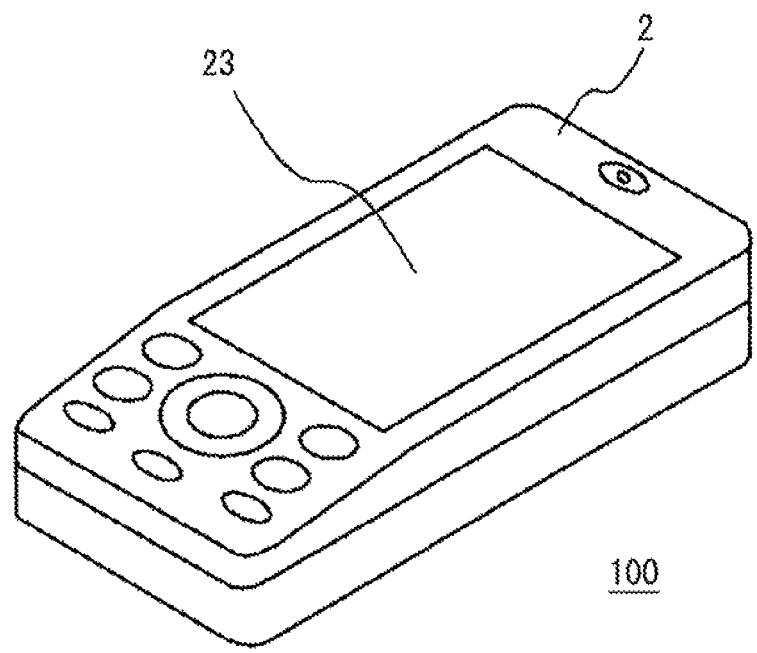
FIG. 1A is a perspective view of a mobile phone 100 equipped with a sliding structure for a housing in accordance with the present invention.
Figure 1B:
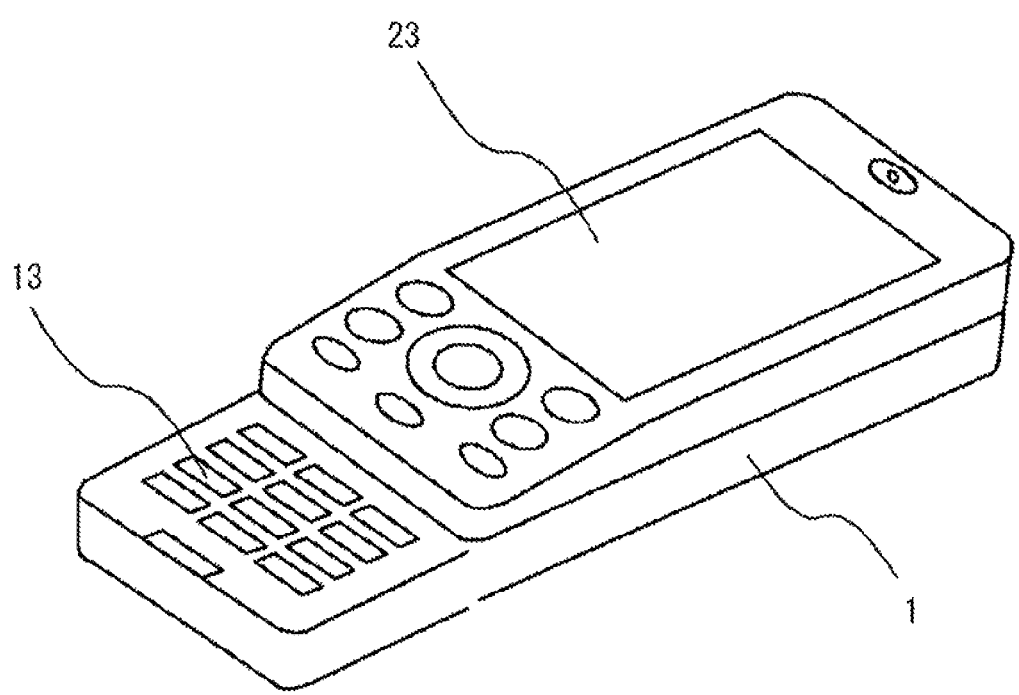
FIG. 1B is a perspective view of a mobile phone 100 equipped with a sliding structure for a housing in accordance with the present invention.

A case where a sliding structure for a housing in accordance with the present invention is used in a mobile phone is explained hereinafter. FIGS. 1A and 1B show perspective views of a mobile phone using a semiautomatic sliding structure. In a mobile phone 100, a lower housing 1 equipped with a manipulation portion 13 and the like and an upper housing 2 equipped with a display portion 23 and the like slide on each other along the longitudinal direction of the housings. FIG. 1A shows the so-called closed state where the lower housing 1 and the upper housing 2 are completely placed on top of the other so that the manipulation portion 13 and the like provided on the lower housing 1 are covered by the upper housing 2. FIG. 1B shows the so-called opened state where the upper housing 2 is slid with respect to the lower housing 1 in the longitudinal direction of the housings so that the manipulation portion 13 and the like provided on the lower housing 1 are exposed. Since the manipulation portion 13 and the display portion 23 and the like are similar to those in ordinary mobile phones, their explanation is omitted.

Figure 2:
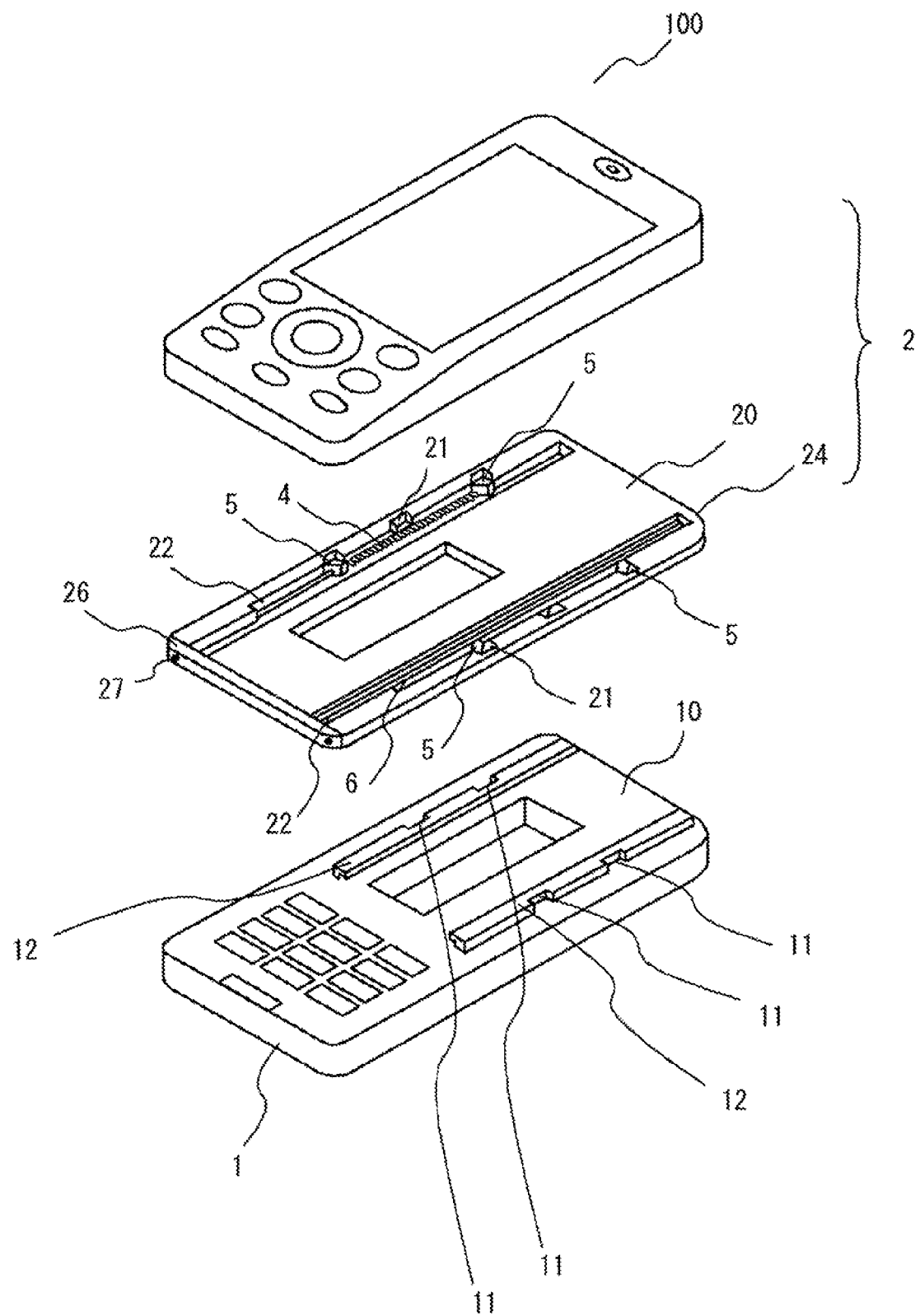
FIG. 2 is an exploded perspective view of a mobile phone 100 equipped with a sliding structure for a housing in accordance with the present invention.

FIG. 2 is an example of an exploded perspective view of a mobile phone in which a sliding structure in accordance with the present invention is provided. In FIG. 2, 10 is an upper-surface portion of the lower housing of the mobile phone 100 is denoted as "10", and a lower-surface portion of the upper housing is denoted as "20". In the following explanation, the upper-surface portion of the lower housing is referred to as "lower housing 1", and the lower-surface portion 20 of the upper housing is referred to as "upper housing 2". Two guide rails 12 are fixed to the lower housing 1. Two grooves for guide rails 22 are formed on the upper housing 2. The grooves for guide rails 22 of the upper housing 2 are left open at lower ends, and after the upper housing 2 is inserted in the lower housing 1 from the opened lower-end portion, a fixing member 26 is fixed with screws 27 so that the lower housing 1 and the upper housing 2 are integrated.

Figure 3:
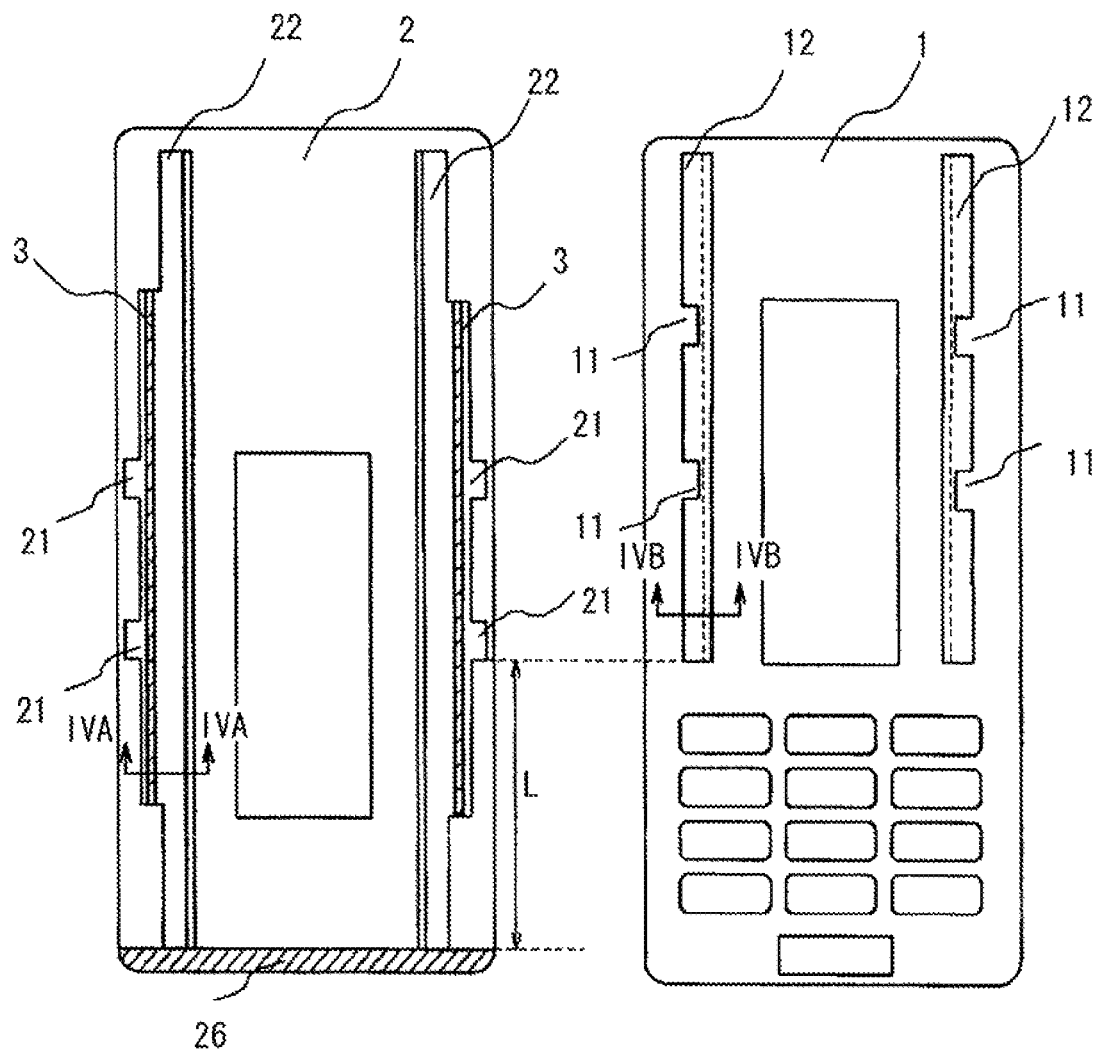
FIG. 3 is a front view of a lower housing 1 and an upper housing 2 of a mobile phone equipped with a sliding structure for a housing in accordance with the present invention.

FIG. 3 shows a front view of the lower housing 1 (top-surface portion) and the upper housing 2 (bottom-surface portion). Two notches 11 are formed on the outer side of each guide rail 12 of the lower housing 1. Grooves for guide rails 22 having a length obtained by adding a sliding length L to the length of the guide rail 12 are formed on the upper housing 2. Each groove for a guide rail 22 has a wider width in the middle portion in the longitudinal direction, and two notches 21 are formed on the outer side of this wider-width portion. Furthermore, a stick-shaped shaft 3 (hatched portion) is fixed in the wider-width portion of the groove for a guide rail 22.

The guide rail 12 and the groove for a guide rail 22 also serve as a stopper. In a state where the upper housing 2 is completely closed, the upper-end portion of the guide rail 12 contacts with the upper-end portion of the groove for a guide rail 22 so that the upper housing 2 cannot slide further in the downward direction and stopped. On the other hand, in a state where the upper housing 2 is completely opened, the lower-end portion of the guide rail 12 contacts with the lower-end portion of the groove for a guide rail 22, i.e., the fixing member 26 so that the upper housing 2 cannot slide further in the upward direction and stopped.

Figure 4A:
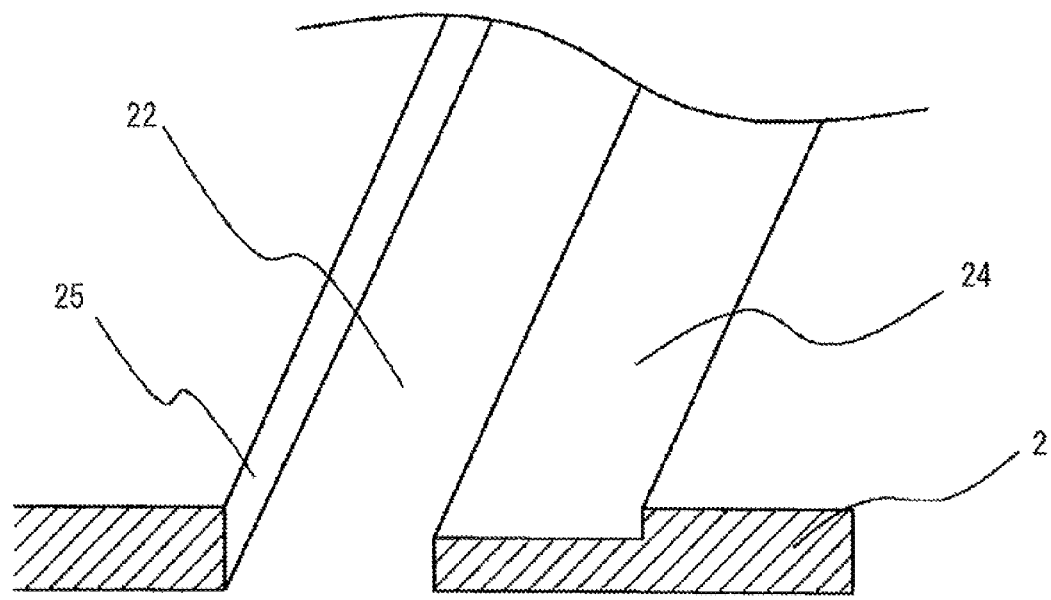
FIG. 4A is an explanatory diagram of a guide rail 12 and a groove for a guide rail 22.
Figure 4B:
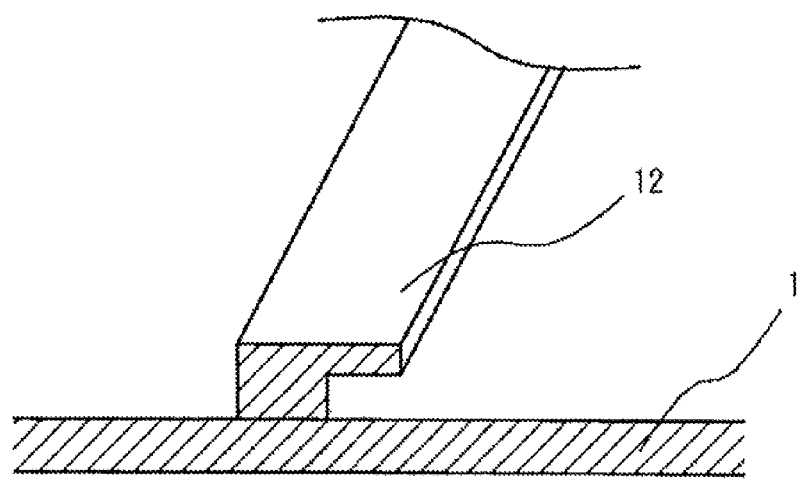
FIG. 4B is an explanatory diagram of a guide rail 12 and a groove for a guide rail 22.
Figure 4C:
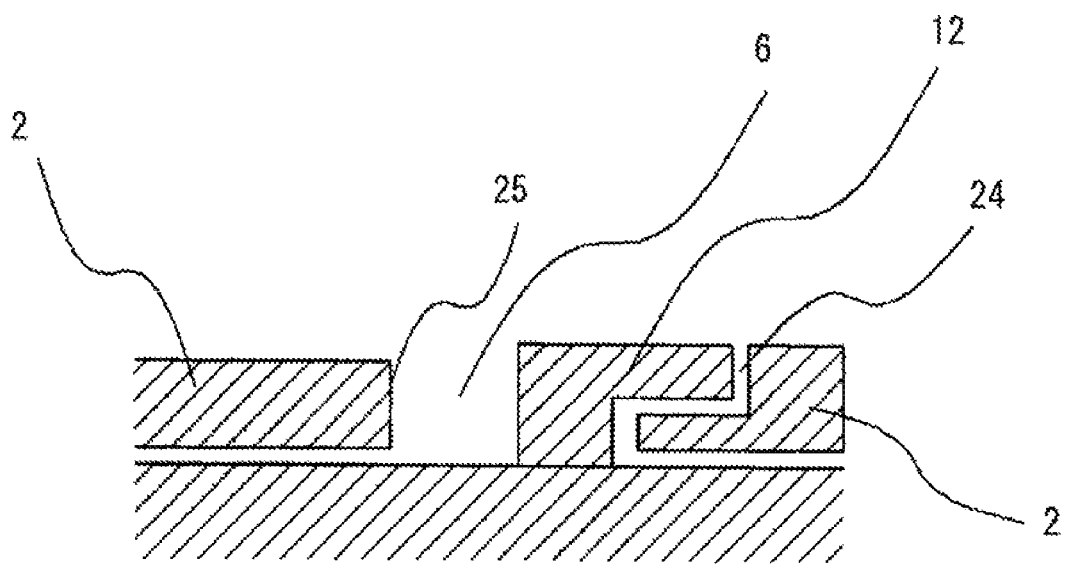
FIG. 4C is an explanatory diagram of a guide rail 12 and a groove for a guide rail 22.

An example of the structure of the guide rail 12 and the groove for a guide rail 22 is further explained with reference to FIGS. 4A to 4C. FIGS. 4A and 4B show a IVA-IVA section and a IVB-IVB section of FIG. 3 respectively, and FIG. 4C shows a state where the guide rails 12 are inserted in the grooves for guide rails 22. Note that the shaft 3 is omitted in FIGS. 4A to 4C. FIG. 4A shows a wider-width portion of the groove for a guide rail 22. The left-side sidewall of the wider-width portion is formed in a step shape (hereinafter shown as "step portion 24"), and notches 21 (not appearing in FIGS. 4A to 4C) are formed on the right-side sidewall (hereinafter referred to as "engaging wall 25"). In FIG. 4B, a guide rail 12 fixed to the lower housing 1 has an inverse L-shaped cross section, and the L-shaped guide rail 12 is inserted into the step portion 24 of the groove for a guide rail 22 so that the upper housing 2 is integrated with the lower housing 1.

In FIG. 4C, proper play is formed between the guide rail 12 and the step portion 24, so that the upper housing 2 smoothly slides from the proximal end to the distal end along the guide rail 12 of the lower housing 1 with this play. Furthermore, when the guide rail 12 is inserted into the groove for a guide rail 22, a gap is formed between the engaging wall 25 of the groove for a guide rail 22 and the guide rail 12. A shaft 3, a spring 4, and a lock member 5 are arranged in this gap. The groove formed between the engaging wall 25 and the guide rail 12 is referred to as "lock member arranging groove 6".

Figure 5A:
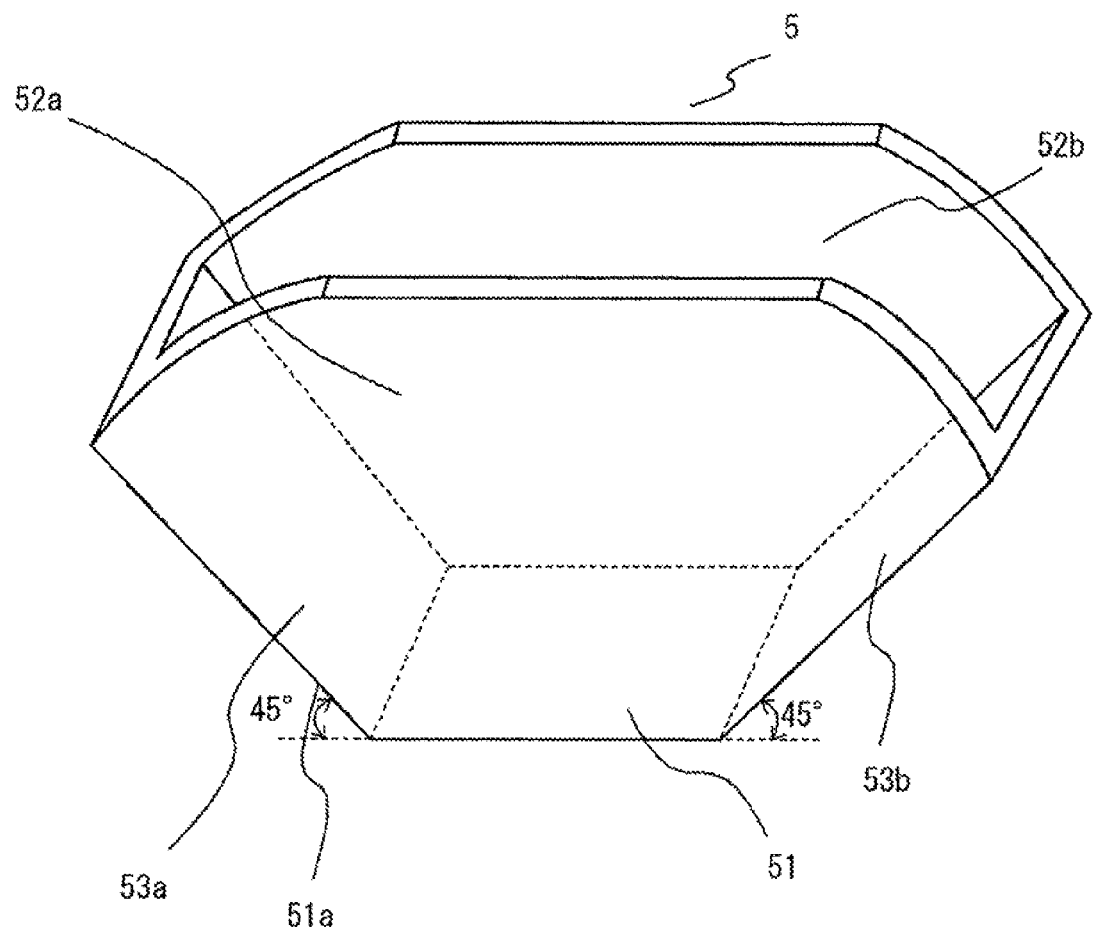
FIG. 5A is a perspective view of a lock member of a sliding structure for a housing in accordance with the present invention.

Next, an example of a lock member 5 is explained with reference to FIGS. 5A and 5B. The lock member 5 moves within the lock member arranging groove 6 along the guide rail 12. In FIG. 5A, the lock member 5 is a pentahedron that has one opening side and composed of a bottom surface 51, vertical side surfaces 52a and 52b rising vertically from the bottom surface 51, and slanted surfaces 53a and 53b rising in outward directions from the sides of the bottom surface 51. Note that the vertical side surface 52a and 52b are not indispensable. For example, it may be constructed by folding both ends of a long-belt-shaped thin plate upward and forming a hole for inserting a shaft or a similar manner.

Figure 5B:
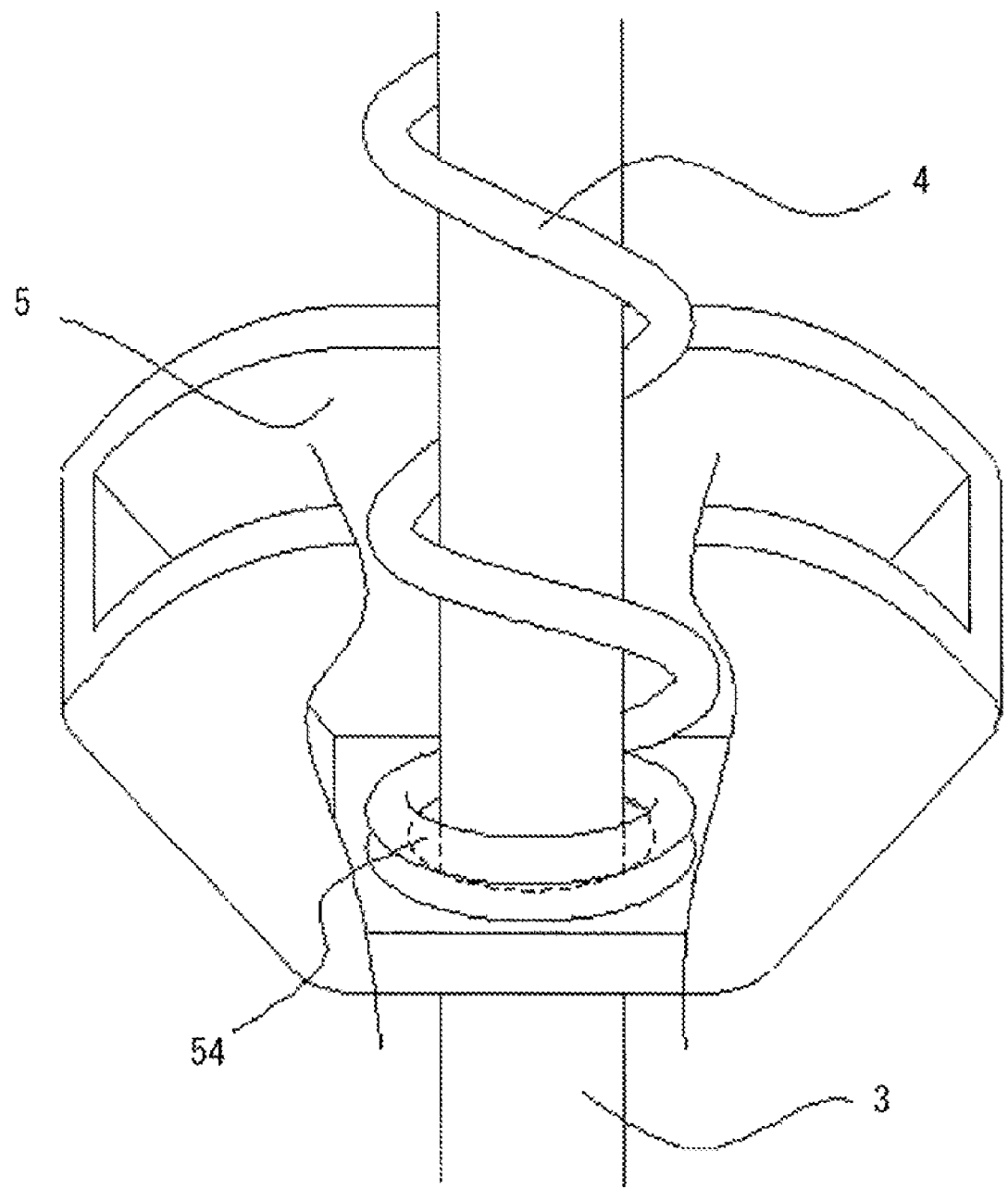
FIG. 5B is a perspective view of a lock member of a sliding structure for a housing in accordance with the present invention.

FIG. 5B shows an example illustrating a state where a shaft 3 inserted inside a spring 4 is inserted through an insertion hole 54 from the opened-surface side of the lock member 5. An elliptic insertion hole 54 is formed on the bottom surface 51 of this lock member 5 so that the shaft 3 fixed to the lock member arranging groove 6 is inserted therethrough. This insertion hole 54 is formed in such a size that the shaft 3 can pass through it but the spring 4 cannot pass through it. By inserting the shaft 3 through the insertion hole 54 of the lock member 5, the lock member 5 can move in a stable manner using the shaft 3 as the axis whenever the lock member 5 moves along the guide rail 12. On the other hand, since the spring 4 cannot pass through the insertion hole 54, it is stopped at the bottom surface 51 of the lock member 5.

In FIG. 5A, each of the slanted surfaces 53a and 53b of the lock member 5 is outwardly inclined at 45 degrees with respect to the bottom surface 51 as an example in this exemplary embodiment of the present invention. Furthermore, each of the vertical side surfaces 52a and 52b is roughly a trapezoid created by cutting off the top and bottom of a sector. This lock member 5 is formed in such a size that the lock member 5 is lodged in the notches 11 and 12 even when the angle of the lock member 5 is changed, and thereby preventing the lock member 5 to pass through the lock member arranging groove 6. As an example, the following exemplary embodiment is designed such that the width of the bottom surface of the lock member 5 and the width of the lock member arranging groove 6 are equal to each other. Note that the angle between each of the slanted surfaces 53a and 53b and the bottom surface 51 is not limited to 45 degrees.

Figure 6A:
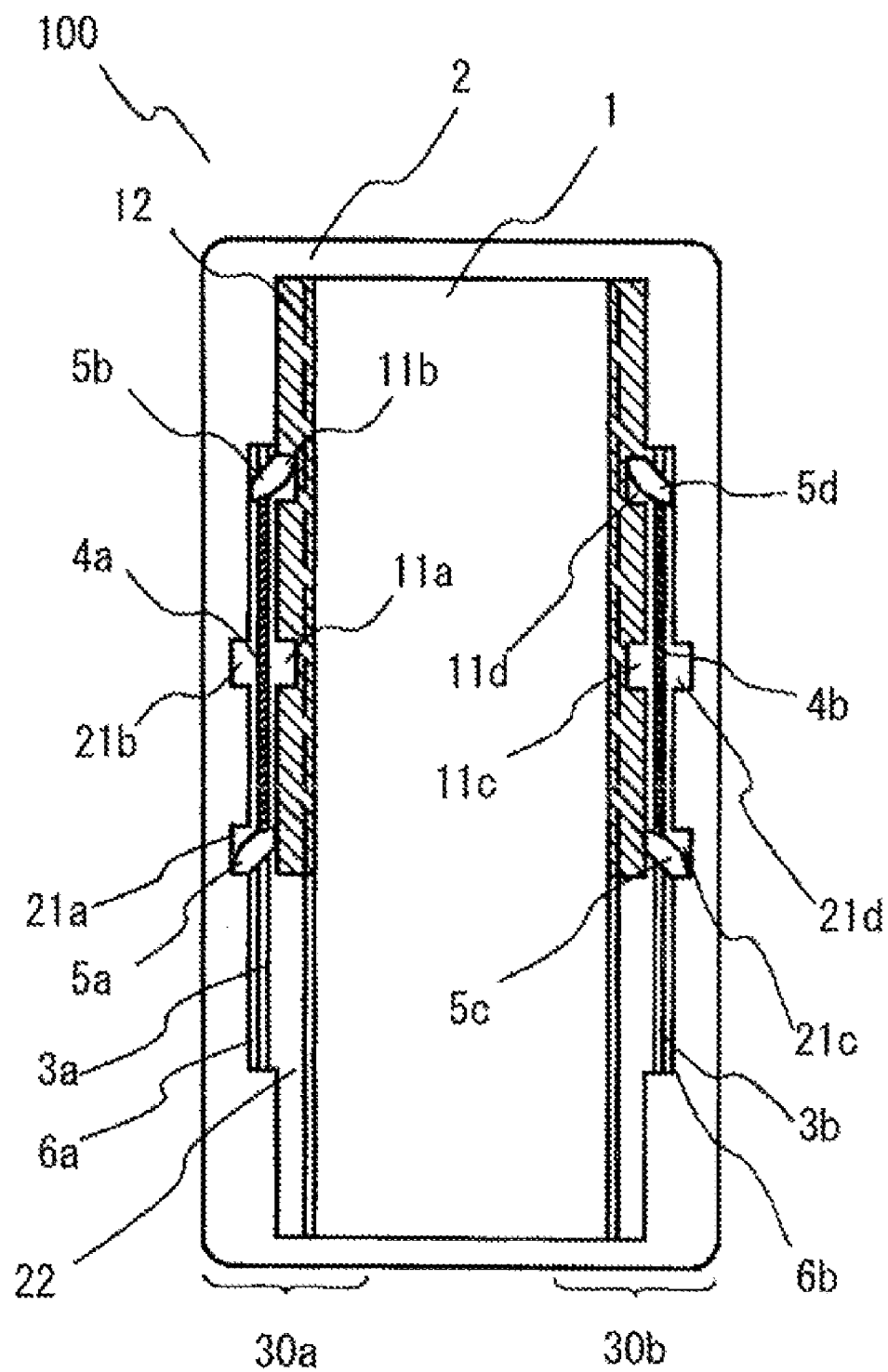
FIG. 6A is an exploded front view of a mobile phone 100 equipped with a sliding structure for a housing in accordance with the present invention in a closed state.
Figure 6B:
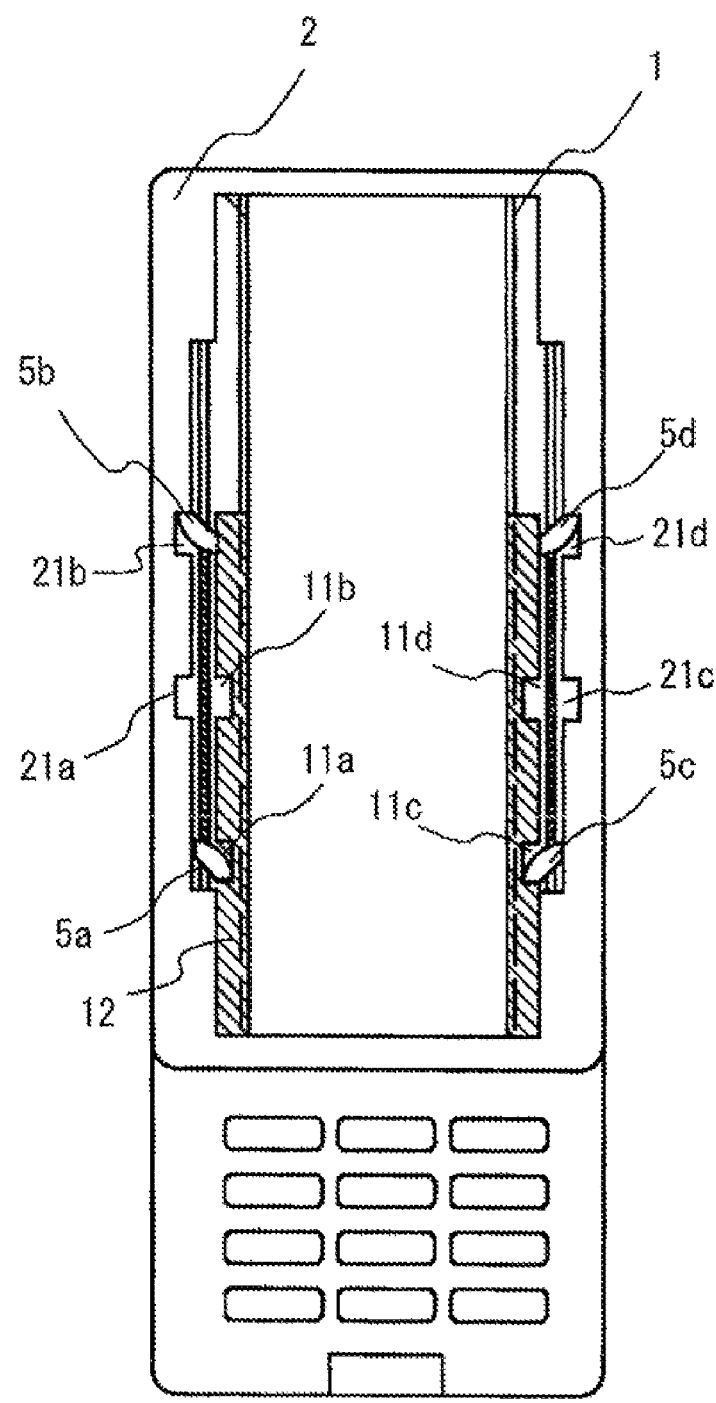
FIG. 6B is an exploded front view of a mobile phone 100 equipped with a sliding structure for a housing in accordance with the present invention in an opened state.

Next, workings of the above-mentioned lock member 5 in the sliding structure are explained with reference to FIGS. 6A and 6B. FIGS. 6A and 6B shows a closed state and an opened state of a mobile phone respectively in which two sliding structures in accordance with this exemplary embodiment of the present invention are arranged in parallel. In FIGS. 6A and 6B, two sliding structures are arranged in axial symmetry in a mobile phone 100. Notches 11a to 11d are arranged in the guide rails 12 of the lower housing 1 and notches 21a to 21d are arranged in the wider-width portion (lock member arranging groove 6a and 6b) of the grooves for guide rails 22 of the lower housing 1 in the mobile phone 100. Shafts 3a and 3b are fixed in the lock member arranging grooves 6a and 6b respectively, and they are inserted through respective springs 4a and 4b and lock members 5a to 5d. Note that the free lengths of the springs 4a and 4b are sufficiently longer than the possible distance between the lock member 5a and the lock member 5b, and between the lock member 5c and lock member 5d respectively, so that the springs 4a and 4b are constantly exerting expanding forces in the sliding structures 30a and 30b. In this exemplary embodiment of the present invention, compression coil springs are used for the springs 4a and 4b. Since the sliding structure 30a and 30b perform identical actions in the longitudinal direction, only the sliding structure 30a is explained hereinafter.

In the sliding structure 30a, a shaft 3a that is inserted through the lock member 5a, the spring 4a, and the lock member 5b in this order is fixed in the lock member arranging groove 6a. The shaft 3 is inserted in such a manner that the opened surfaces of the lock members 5a and 5b are opposed to each other with the spring 4a interposed therebetween. Since the spring 4a cannot pass through the insertion holes of the lock members 5a and 5b as described above, it is stopped at the bottom surfaces of the lock members 5a and 5b and presses the lock members 5a and 5b in the outward directions from each other.

In the closed state of the upper housing 2 shown in FIG. 6A, the lock members 5a and 5b are arranged in the notch 21a of the upper housing 2 and the notch 11b of the lower housing 1 respectively. Since the width of the bottom surface 51 of the lock members 5a and 5b is equal to the width of the lock member arranging groove 6a as stated above, the lock members 5a and 5b cannot pass through the lock member arranging groove 6a and is stopped in a state where they have been tumbled into the notch 21a and the notch 11b. In this point, with the pressing force of the spring 4a, the lock member 5a presses the sidewall of the notch 21a of the upper housing 2 downward, and the lock member 5b presses the sidewall of the notch 11b of the lower housing 1 upward. That is, both of the lock members 5a and 5b act so as to slide the upper housing 2 downward with respect to the lower housing 1. Meanwhile, in the state shown in FIG. 6A, the upper-end portion of the guide rail 12 contacts with the upper end of the groove for a guide rail 22, so that the upper housing 2 is positioned so as not to slide further downward. Therefore, the mobile phone 100 is maintained in the closed state in a stable manner.

In contrast, in the opened state of the upper housing 2 shown in FIG. 6B, the lock members 5a and 5b are arranged in a state where they have been tumbled into the notch 11a of the lower housing 1 and the notch 21b of the upper housing 2 respectively. In this point, with the pressing force of the spring 4a, the lock member 5a presses the sidewall of the notch 11a of the lower housing 1 downward, and the lock member 5b presses the sidewall of the notch 21b of the upper housing 2 upward. That is, they act so as to slide the upper housing 2 upward with respect to the lower housing 1. Meanwhile, the lower-end portion of the guide rail 12 contacts with the lower end of the groove for a guide rail 22, so that the upper housing 2 is positioned so as not to slide further upward. Therefore, the mobile phone 100 is maintained in the opened state in a stable manner. In the following explanation, a case where lock members 5a and 5b and a spring 4 having the above-mentioned structure are used is explained in each of the following exemplary embodiments. However, a component that is constructed by folding both ends of a long-belt-shaped thin plate upward or a similar component may be used as the lock members 5a and 5b. Further, a plate spring or the like may be used as the spring 4.

A first exemplary embodiment of a sliding structure for a housing in accordance with the present invention is explained with reference to FIGS. 7A to 7E. In this exemplary embodiment, two sliding structures 30a and 30b are arranged in parallel in a mobile phone 100. Note that since these two sliding structures are arranged in axial symmetry and work identically with each other in the longitudinal direction, the actions of the left side sliding structure 30a is mainly explained hereinafter. This exemplary embodiment of the present invention is configured such that the distance between the notch 11b and the notch 21a is equal to the sliding length L in the closed state of the upper housing 2 shown in FIG. 7A. Furthermore, both of the distance between the notches 11a and 11b and the distance between the notches 21a and 21b are equal to one half of the sliding length L. That is, the notches 11a and 21b are located at the exact center between the notch 11b and the notch 21a. Note that in the closed state of the upper housing 2, the upper-end portion of the guide rail 12 is engaged with the upper portion of the groove for a guide rail 22.

Furthermore, in this exemplary embodiment of the present invention, the lock member 5a that is located in the rear in the sliding direction (lower side in FIGS. 7A to 7E) is arranged in the notch of the upper housing 2, and the lock member 5b that is located in the front in the sliding direction (upper side in FIGS. 7A to 7E) is arranged in the notch of the lower housing 1. That is, in FIG. 7A, the lock member 5a is arranged in the notch 21a and the lock member 5b is arranged in the notch 11b. Since the width of the bottom surface of the lock members 5a and 5b is substantially equal to the width of the lock member arranging groove 6a as stated above, the lock members 5a and 5b have tumbled into the notches 21a and 11b. Further, by the pressing force of the spring 4a, one slanted surface of the lock member 5a presses the sidewall of the notch 21a downward, and the other slanted surface presses the guide rail 12 in the right direction. Further, one slanted surface of the lock member 5b presses the sidewall of the notch 11b upward, and the other slanted surface presses the engaging wall 25 of the groove for a guide rail 22 (lock member arranging groove 6a) in the left direction.

At this point, since each of the slanted surfaces of the lock members 5a and 5b is inclined at 45 degrees with respect to the bottom surface, it is also inclined at 45 degrees with respect to the spring 4a. If a pressing force is applied to the bottom surface from the spring 4a in this state, the spring weight is strongly applied on the side where the spring 4 is compressed. That is, a clockwise torque is applied to each of the lock members 5a and 5b.

Furthermore, since the lock member 5a presses the notch 21a of the upper housing 2 downward and the lock member 5b presses the notch 11b of the lower housing 1 upward, a force that causes the upper housing 2 to slide downward with respect to the lower housing 1 is exerted on the upper housing 2. On the other hand, a stopper function is acted on the upper housing 2 by the rail 12 and the groove for a rail 22. Therefore, the mobile phone is maintained in the closed state in which a constant pressing force is exerted.

When the manipulation portion 13 arranged on the lower housing 1 is to be exposed from this state in order to carry out to the right with respect to the spring 4, the lock member 5a receives a counter-clockwise torque. Furthermore, since the lock member 5b tumbles into the notch 21b, one slanted surface of the lock member 5b presses the sidewall of the notch 21b upward and the other slanted surface presses the guide rail 12 to the right, so that a counter-clockwise torque is similarly applied to the lock member 5b.

Figure 7E:
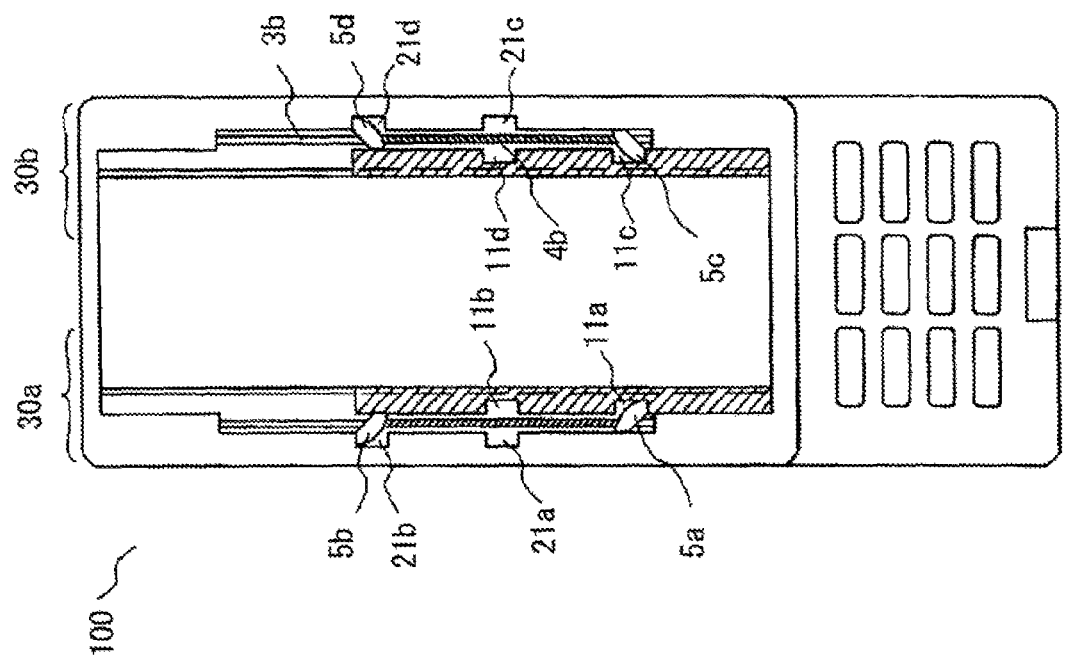
FIG. 7E is an exploded front view showing a sliding process of a mobile phone 100 equipped with a sliding structure for a housing in accordance with a first exemplary embodiment of the present invention.

That is, since the lock member 5a presses the lower housing 1 downward and the lock member 5b presses the upper housing 2 upward, the upper housing 2 automatically slides in the opening direction with respect to the lower housing 1 in the mobile phone 100 even if it is not manually slid further. Then, when the upper housing 2 is positioned by the stopper function of the guide rail 12 and the groove for a guide rail 22, the mobile phone 100 is maintained in the opened state in which a constant pressing force is exerted (FIG. 7E).

As has been described above, the lock member 5a, which had tumbled into the notch 21a of the upper housing 2 and has pressed the upper housing 2 downward, moves to the notch 11a, so that the lock member 5a changes so as to, at this time, press the lower housing 1 downward. The movement from the notch 21a to the notch 11a automatically occurs during the sliding action process by the a telephone call or send an email with the mobile phone, the user slides the upper housing 2 upward with respect to the lower housing 1 against the pressing force by the spring 4a. At this point, the lock members 5a and 5b move upward along the guide rail 12 and the engaging wall 25 while the clockwise torques are exerted on the lock members 5a and 5b (FIG. 7C). When the upper housing 2 is manually slid further upward, the notch 11a and the notch 21b are aligned with the notch 21a and the notch 21b respectively at the middle position in the sliding length L. At this point, the lock members 5a and 5b are released from the guide rail 12 and the engaging wall 25, which have prevented them to rotate in the right direction, and therefore the lock members 5a and 5b rotate in the clockwise direction so that their opened portions are opposed to each other (FIG. 7C).

Figure 7D:
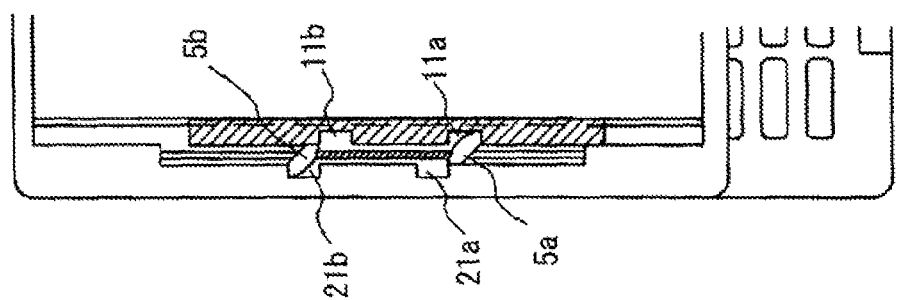
FIG. 7D is an exploded front view showing a sliding process of a mobile phone 100 equipped with a sliding structure for a housing in accordance with a first exemplary embodiment of the present invention.

When the user manually slides the upper housing 2 further with respect to the lower housing 1 from this state, the lock members 5a and 5b are, at this time, pressed against the sidewalls of the notches 21a and 11b and tumble into the notches 11a and 21b (FIG. 7D). When the lock member 5a has completely tumbled into the notch 11a, one slanted surface of the lock member 5a presses the sidewall of the notch 11a downward and the other slanted surface presses the engaging wall 25 in the left direction. Furthermore, since the bottom surface of the lock member 5a is inclined at 45 degrees torque generated by the press from the spring 4a. Therefore, it is possible to provide the so-called semiautomatic sliding structure with which, after manually opened to the middle position in the sliding length L, the upper housing 2 automatically and completely opens until it is stopped by the stopper.

A sliding structure 30a in accordance with this exemplary embodiment of the present invention can be mainly realized by two lock members 5a and 5b arranged on both side of a spring 4a, and notches 11a, 11b, 21a and 21b arranged on the right side and the left side of the lock members 5a and 5b. Therefore, it is possible to provide a semiautomatic sliding structure capable of saving space and coping with downsizing and reduction in weight. Furthermore, since two sliding structures 30a and 30b are formed independently from each other in this exemplary embodiment of the present invention, it is possible to ensure sufficiently large space between these two sliding structures 30a and 30b, and to arrange components and wiring and the like in that space without restraint.

Figure 8E:
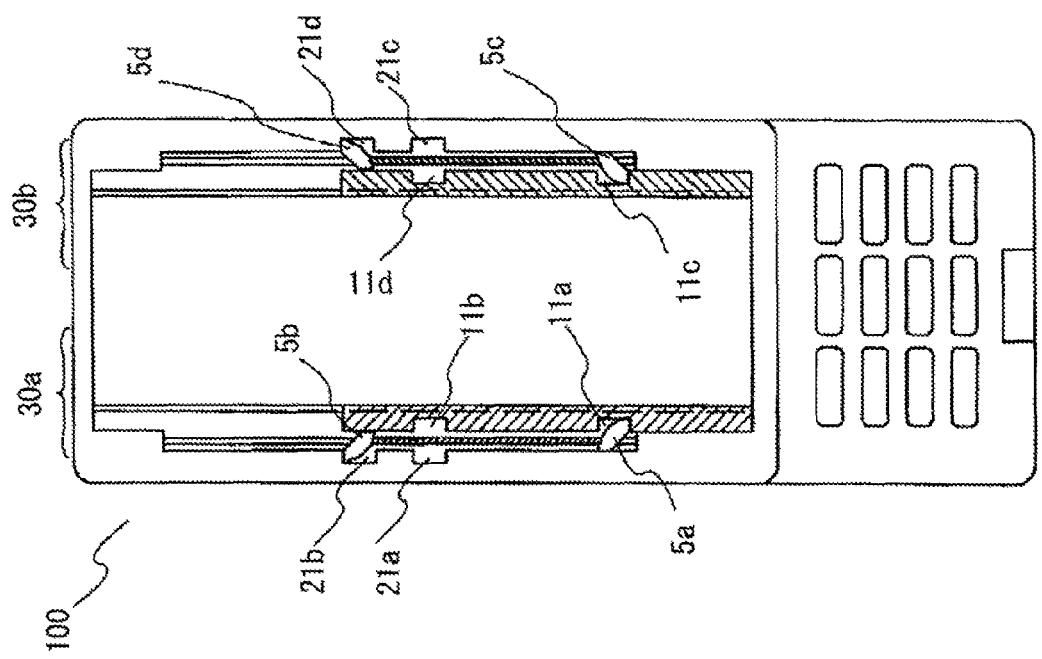
FIG. 8E is an exploded front view showing a sliding process of a mobile phone 100 equipped with a sliding structure for a housing in accordance with a second exemplary embodiment of the present invention.

Note that although the first exemplary embodiment is configured such that the distance between the notches 11a and 11b and the distance between the notches 21a and 21b are equal to each other, the present invention is not limited to this configuration. When the distance between the notches 11a and 11b and the distance between the notches 21a and 21b are different from each other, the timings at which the angles of the lock member 5a and the lock member 5b change becomes different. Therefore, the timing at which the pressing force exerted on the upper housing 2 is changed is shifted. FIG. 8 shows a second exemplary embodiment of the present invention.

Figure 8D:
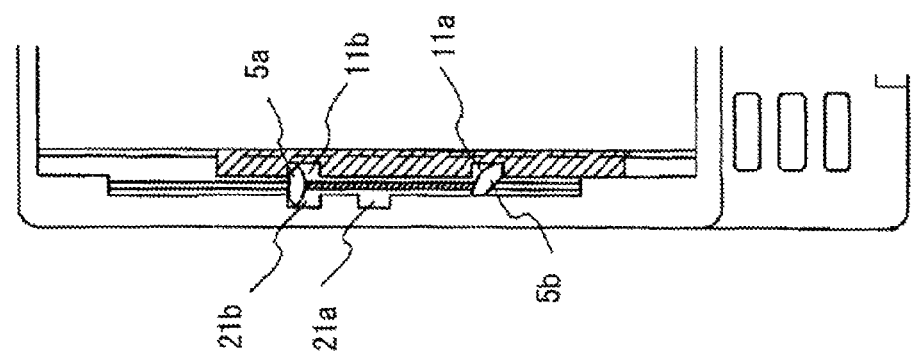
FIG. 8D is an exploded front view showing a sliding process of a mobile phone 100 equipped with a sliding structure for a housing in accordance with a second exemplary embodiment of the present invention.

In FIGS. 8A to 8E, although the lock member 5a rotates and the direction of the pressing force changes immediately after the upper housing 2 is opened (FIG. 8B), the lock member 5b does not rotate until the upper housing 2 is opened further and the notch 11b is aligned with the notch 21b (FIG. 8D). In a state shown in FIG. 8C, since both the lock member 5a and the lock member 5b are applied to the lower housing 1, no sliding load occurs, and therefore the upper housing 2 is in a neutral position unless it is manually moved. By using the section from the state in FIG. 8B to the state in FIG. 8D, it is possible, for example, to expose only the lower half of the manipulation portion or to expose only the lens of the camera.

Figure 9:
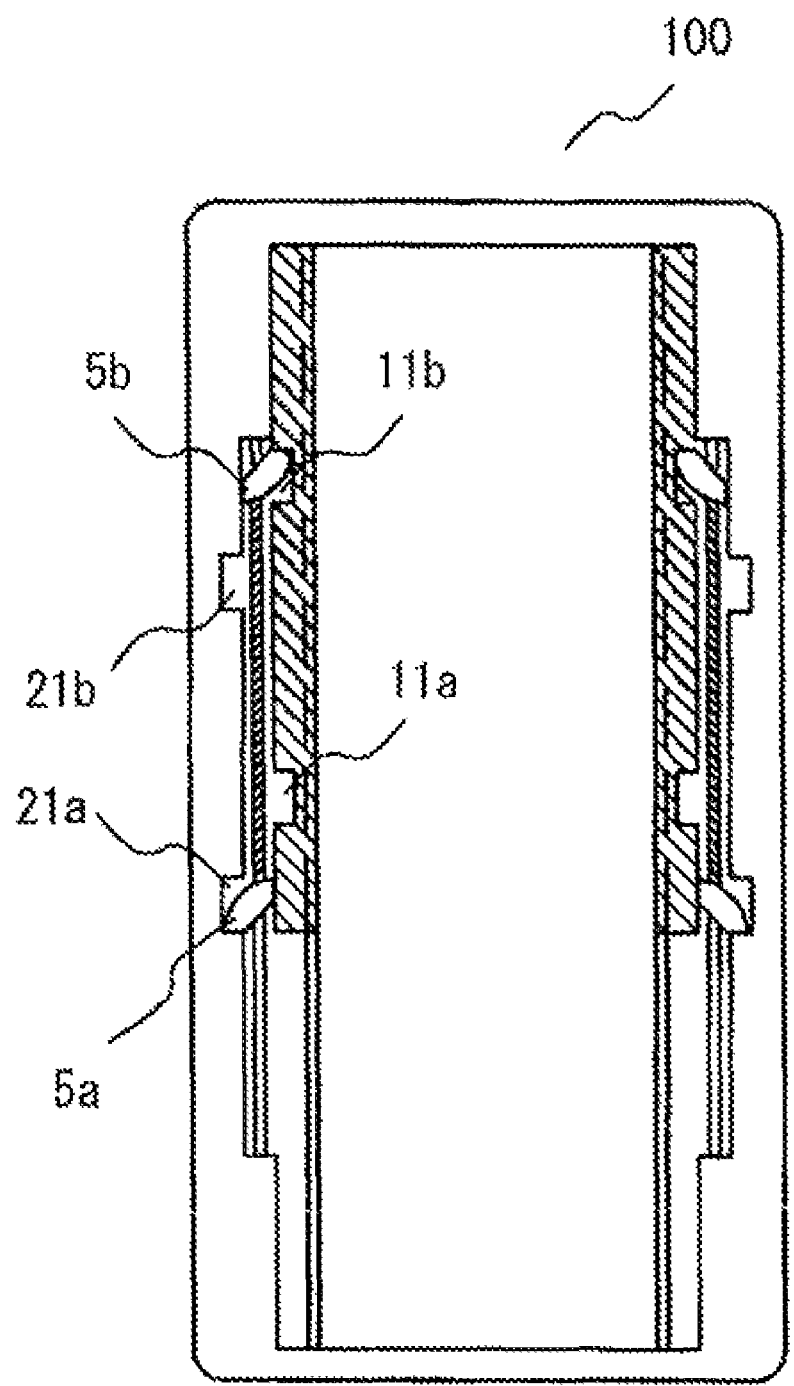
FIG. 9 is an exploded front view of a mobile phone 100 equipped with a sliding structure for a housing in accordance with a third exemplary embodiment of the present invention.

Furthermore, although both of the distance between the notches 11a and 11b and the distance between the notches 21a and 21b are equal to one half of the sliding length L in the first exemplary embodiment of the present invention, the present invention is not limited to this configuration. When the distance between the notches 11a and 11b and the distance between the notches 21a and 21b are equal to each other but are different from one half of the sliding length L, it is possible to change the position at which the direction of the pressing force exerted on the upper housing 2 is changed. FIG. 9 shows a third exemplary embodiment of the present invention. In a case where the distance between the notches 11a and 11b and the distance between the notches 21a and 21b are equal to each other and are longer than one half of the sliding length L as shown in FIG. 9, opening the upper housing 2 slightly from the closed state makes the lock members 5a and 5b rotate, and thereby the directions of the pressing forces are changed and the upper housing 2 automatically opens.

Furthermore, although the foremost notch in the sliding direction (upper side in FIGS. 6A and 6B) is formed in the lower housing 1 in the first exemplary embodiment of the present invention, it is also possible to form a notch located in the upper housing 2 as the foremost notch in the sliding direction. When the notch 21b is formed in the uppermost position and the notch 11a is formed in the lowermost position in FIGS. 6A and 6B, the lock member 5b will press the upper housing 2 upward and the lock member 5a will press the lower housing 1 downward, so that the upper housing 2 is pressed so as to slide upward in the closing action. Meanwhile, the stopper function acts so as to prevent the upper housing 2 from opening. Therefore, when the stopper is disengaged, the upper housing 2 automatically opens partway, and then the upper housing 2 is to be manually moved to the opened state.

As has been described above, it is possible, in this sliding structure 30a, to change the direction of the pressing force in a predefined position, to provide a section of a neutral state, and to change the length of a section in which the sliding action is automatically performed by changing the positions at which the notches 11 and 21 are formed. Note that the shaft 3 is not indispensable. The only requirements are that the free length of the spring should be sufficiently longer than the distance between the lock members and that the lock member 5 should be formed in such a size that it cannot pass through the lock member arranging groove 6. With such a structure, just pushing two lock members 5 into the lock member arranging groove 6 in such a manner that the spring 4 is placed between these two lock members makes the lock members 5 engaged with the notches 11 and 21 while they are pressed by the spring 4. Furthermore, two sliding structures 30a and 30b are arranged in parallel for the mobile phone 100 in each of the above embodiments, a singly sliding structure may be provided at the center of the mobile phone 100, or three or more sliding structures may be provided depending on the size of the housing. Meanwhile, it is also possible to provide three or more notches in each of the lower housing 1 and the upper housing 2. In this case, it is possible to establish plural neutral states halfway through the sliding.

Next, a fourth exemplary embodiment of the present invention is explained. In this exemplary embodiment of the present invention, each sliding structure is equipped with three notches. Also in this exemplary embodiment, the right-side sliding structure is explained. In FIGS. 10A to 10E, a guide rail in which a notch 11a is formed is fixed to the lower housing, and a groove for a guide rail (lock member arranging groove 6a) in which notches 21a and 21b are formed is formed in the upper housing. In a closed state of the upper housing (FIG. 10A), the notch 11a is located above the notch 21b, and the notch 21b is located between the notch 11a and the notch 21a. Furthermore, the lock member has been tumbled into the notch 21a and the lock member 5b has been tumbled into the notch 11a.

Figure 10C:
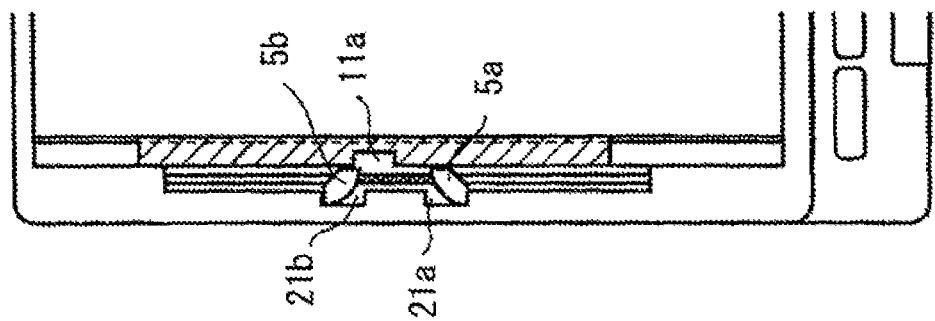
FIG. 10C is an exploded front view showing a sliding process of a mobile phone 100 equipped with a sliding structure for a housing in accordance with a fourth exemplary embodiment of the present invention.
Figure 10B:
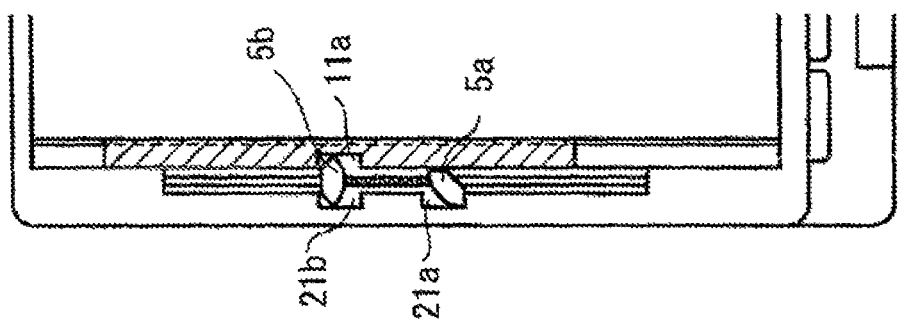
FIG. 10B is an exploded front view showing a sliding process of a mobile phone 100 equipped with a sliding structure for a housing in accordance with a fourth exemplary embodiment of the present invention.
Figure 10A:
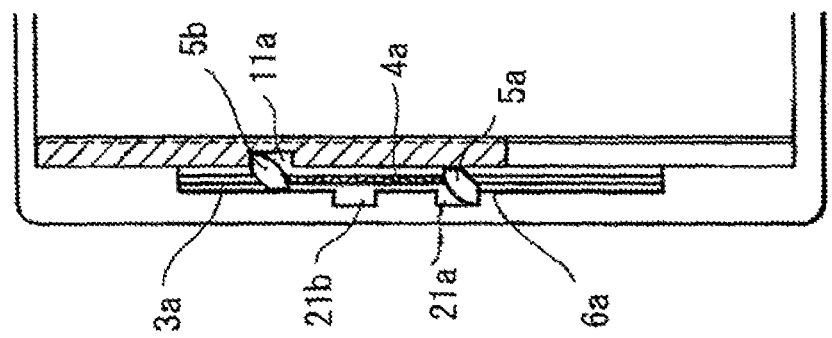
FIG. 10A is an exploded front view showing a sliding process of a mobile phone 100 equipped with a sliding structure for a housing in accordance with a fourth exemplary embodiment of the present invention.
Figure 10E:
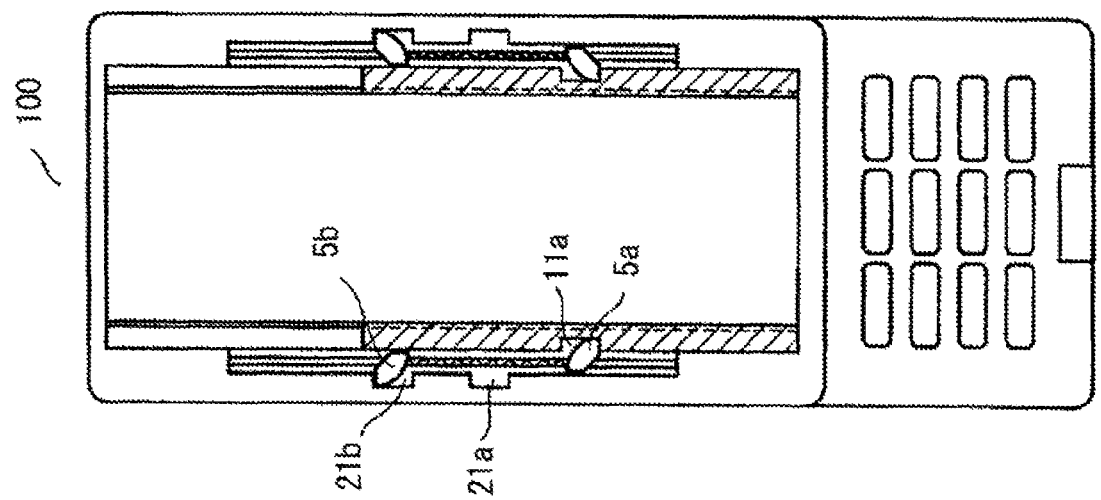
FIG. 10E is an exploded front view showing a sliding process of a mobile phone 100 equipped with a sliding structure for a housing in accordance with a fourth exemplary embodiment of the present invention.
Figure 10D:
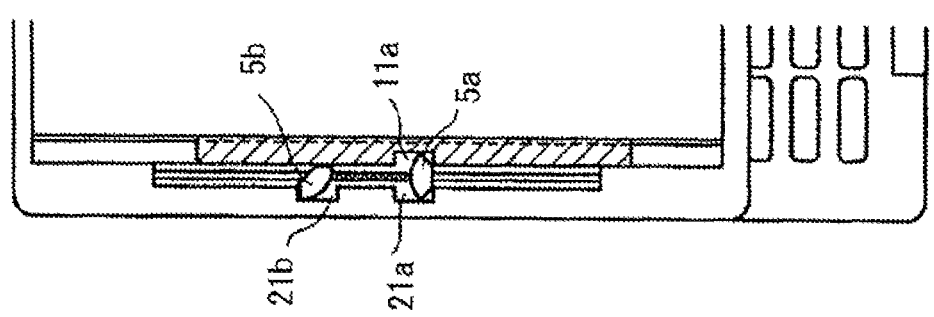
FIG. 10D is an exploded front view showing a sliding process of a mobile phone 100 equipped with a sliding structure for a housing in accordance with a fourth exemplary embodiment of the present invention.

When the user of the mobile phone 100 manually slides the upper housing upward from the closed state shown in FIG. 10A, the lock member 5b first changes its angle toward the side of the notch 21b at a position shown in FIG. 10B. When the upper housing is slid further upward, the lock member 5b, at this time, tumbles into the notch 21b. Further, in a position shown in FIG. 10D, the lock member 5a, at this time, changes its angle and tumbles into the notch 11a. Similarly to the first exemplary embodiment, the lock members 5a and 5b, which have pressed the upper housing in the downward sliding direction by the spring 4a in the state shown in FIG. 10A, change so as to press the upper housing in the upward sliding direction in the state shown in FIG. 10E.

Furthermore, since both the lock member 5a and the lock member 5b are applied to the upper housing during the states shown in FIGS. 10B to 10E, the upper housing is in a neutral state in which no sliding load is applied unless it is manually moved. By using this section, it is possible, for example, to expose only the lower half of the manipulation portion or to expose only the lens of the camera. It should be noted that in this exemplary embodiment of the present invention, the distance between the notch 21a and the notch 11a needs to be shorter than the sliding length L. If it is longer than the sliding length L, the lock member 5a cannot move from the notch 21a to the notch 11a. Note that similar effects can be obtained by forming one notch in the groove for a guide rail (lock member arranging groove 6a) of the upper housing and forming two notches in the guide rail 12 of the lower housing 1.

As has been described above, it is possible to provide a sliding structure having a simpler structure by using only three notches in this exemplary embodiment of the present invention.

Figure 11:
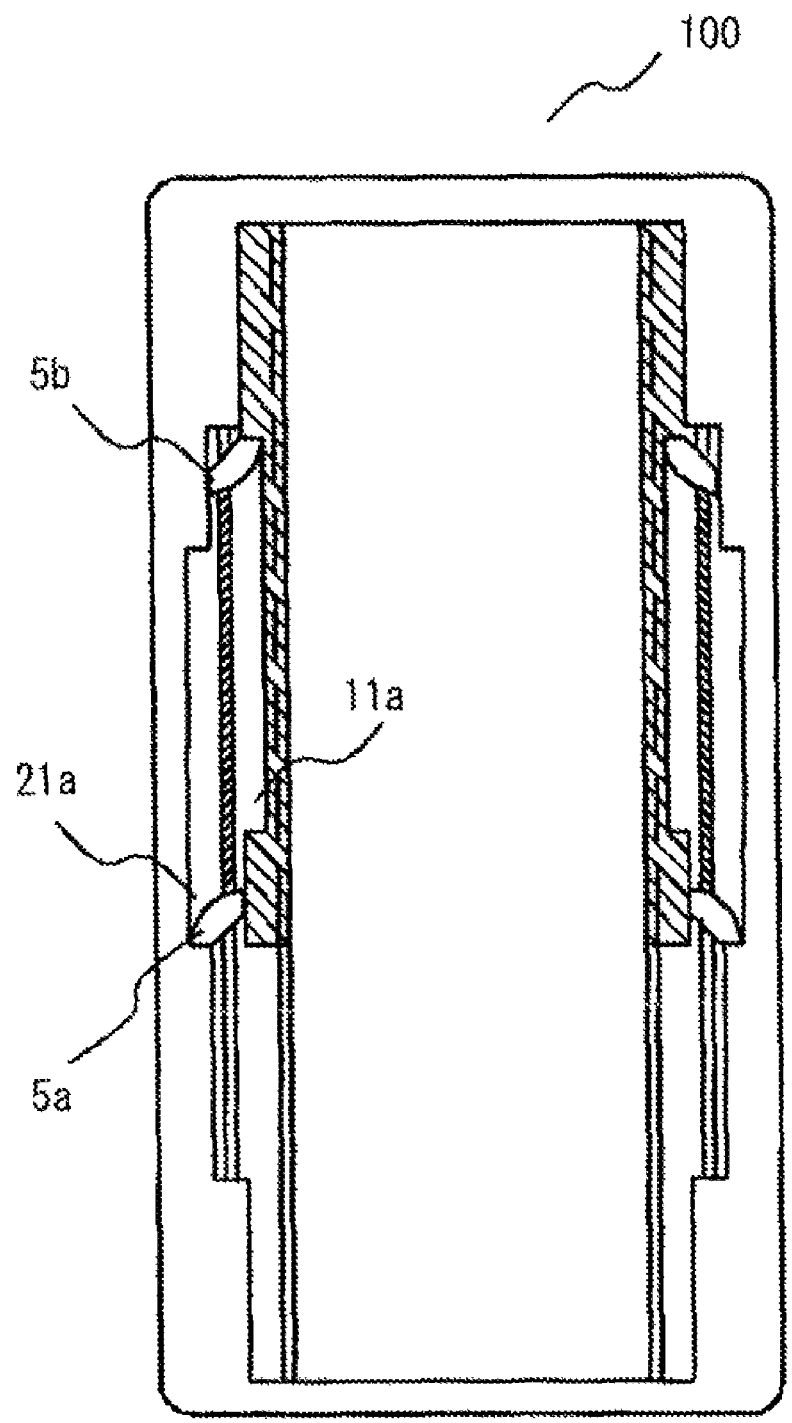
FIG. 11 is an exploded front view of a mobile phone 100 equipped with a sliding structure for a housing in accordance with a fifth exemplary embodiment of the present invention.

Furthermore, a sliding structure for a housing in accordance with the present invention may be obtained by forming one notch in each of the lower housing 1 and the upper housing 2. FIG. 11 shows a fifth exemplary embodiment of the present invention. In this exemplary embodiment, at least one notch is formed in such a size that at least two lock members can be arranged in the longitudinal direction in the notch. Therefore, the lock member 5a uses the lower sidewall of each of the notches 11a and 21a and the lock member 5b uses the upper sidewall of each of the notches 11a and 21a, and by doing so, the direction of the pressing force to the upper housing 2 is changed. The sizes of the notches 11a and 21a in the longitudinal direction are equal to each other in FIG. 11. However, the present invention is not limited to this configuration, provided that they have such sizes that the lower sidewalls of the notches 11a and 21a can pass each other and the upper sidewalls of the notches 11a and 21a can pass each other. By changing the sizes of the notches 11a and 21a in the longitudinal direction, it is possible to change the direction of the pressing force in a predefined position, to provide a section of a neutral state, and to change the length of a section in which the sliding action is automatically performed.

Figure 12A:
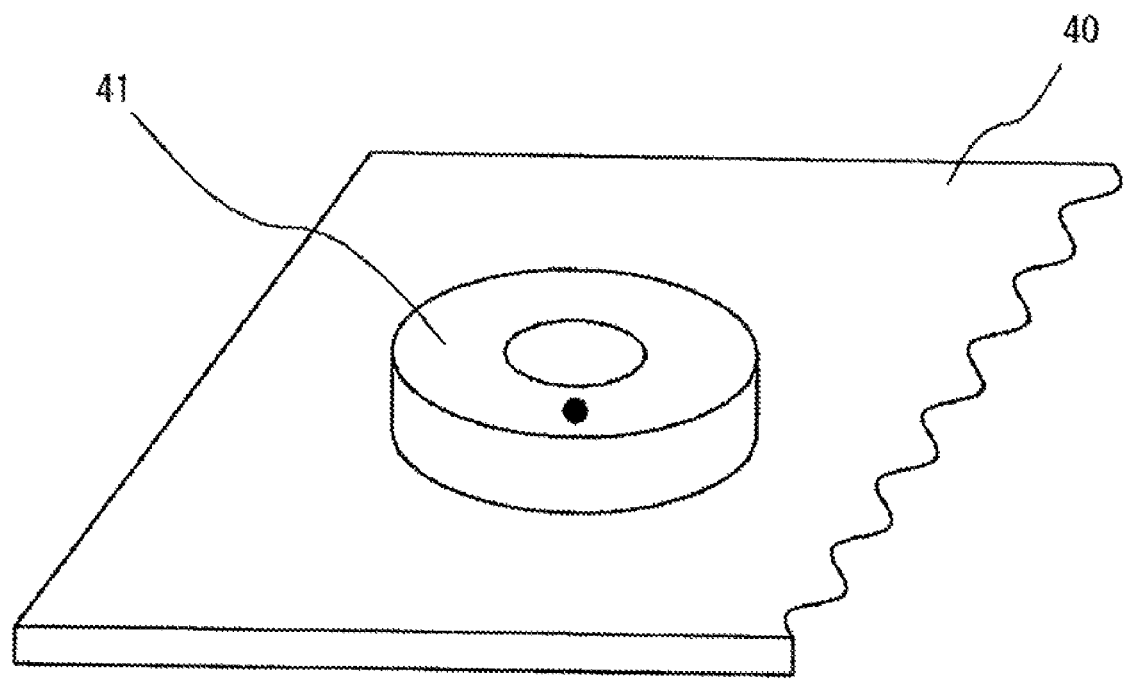
FIG. 12A is an application example of a sliding structure for a housing in accordance with a sixth exemplary embodiment of the present invention.
Figure 12B:
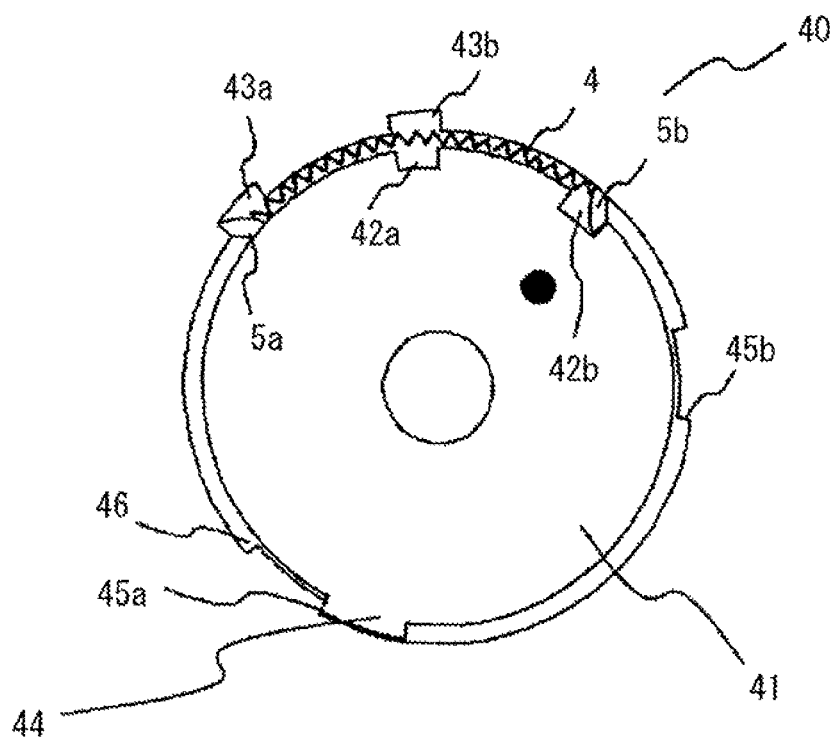
FIG. 12B is an application example of a sliding structure for a housing in accordance with a sixth exemplary embodiment of the present invention.
Figure 12C:
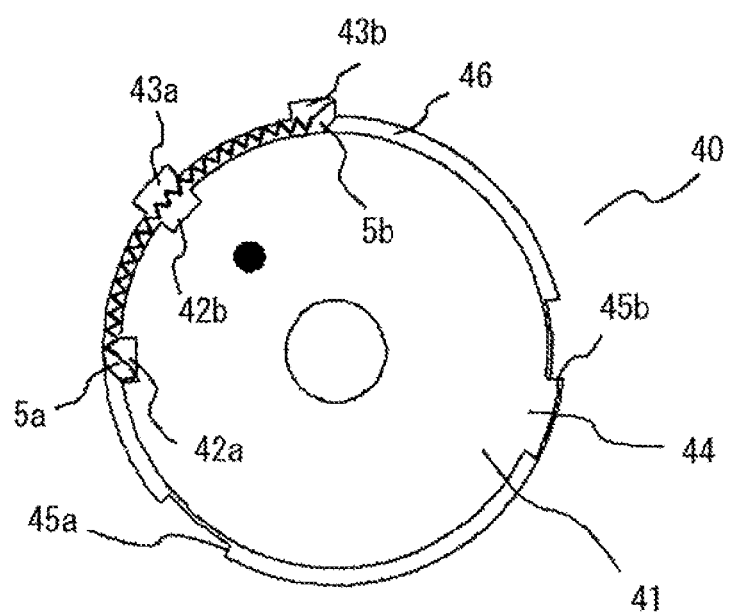
FIG. 12C is an application example of a sliding structure for a housing in accordance with a sixth exemplary embodiment of the present invention.

Furthermore, other exemplary embodiments of the present invention are shown in FIGS. 12A to 12C. FIGS. 12A to 12C show examples in which a sliding structure in accordance with this exemplary embodiment of the present invention is applied to a rotating mechanism for a circular dial. In FIG. 12A, a dial 41 is a circular dial that is rotatable at a predefined angle with respect to a base 40. As shown in FIG. 12B, in addition to being equipped with the dial 41, a circular-shaped groove in which notches 43a and 43b are formed on its sidewall portion is also formed in the base 40. Meanwhile, notches 42a and 42b are formed on the bottom portion of the dial 41. Furthermore, a spring 4 and lock members 5a and 5b arranged at both ends of the spring are arranged in a gap portion formed between the circular-shaped groove and the bottom portion of the dial 41 (hereinafter referred to as "guide groove 46"). In the initial state of the dial 41, the lock member 5a has been tumbled into the notch 43a and the lock member 5b has been tumbled into the notch 43b, and a rotational torque in the clockwise direction is applied to the dial 41 with respect to the base 40. Meanwhile, since a stopper 44 formed on the bottom portion of the dial 41 is engaged with an engaging wall 45a formed in the circular groove of the base 40, the dial 41 is maintained in the initial state.

When the dial 41 is rotated in the counter-clockwise direction against the pressing force of the spring 4 from this state, the lock members 5a and 5b move from the notches 43a and 42b to the notches 42a and 43b. After that, the dial 41 automatically rotates in the counter-clockwise direction and then stops when the stopper 44 engages with the engaging wall 45b. In this state, a force in the counter-clockwise direction is applied to the dial 41 by the spring 4. Therefore, the dial 41 is maintained in the state where a constant counter-clockwise torque is exerted on the dial 41.

Note that by adjusting the positional relation among the notches 42a, 42b, 43a and 43b, it is possible to provide a section of a neutral state and to change the length of a section in which the rotating action is automatically performed. Furthermore, it is also possible to provide three or more notches in each component.

As has been described above, a sliding structure in accordance with the present invention is a space-saving semiautomatic sliding structure mainly composed of a spring, two lock members, and notches arranged on both sides of the spring. Since the lock members are inclined to the left and right with respect to the spring, it is possible to change the directions of the pressing forces applied by the lock members.

In this sliding structure, it is possible to change the direction of the pressing force in a predefined position and to change the section in which the sliding action is automatically performed by changing the positions at which the notches are formed. Furthermore, by changing the spring constant of the spring, the number of notches, and inclined angles of the slanted surfaces of the lock members and the like, it is possible to realize semiautomatic sliding capable of performing various actions.

INDUSTRIAL APPLICABILITY

The present invention can be applied to a sliding structure for a housing that is used by sliding a first housing with respect to a second housing and used in, for example, a mobile phone, and a sliding opening-and-closing housing and a mobile phone equipped with the sliding structure.

The invention claimed is:

1. A sliding structure for a housing of a mobile phone comprising:
   a guide rail formed on a first housing; and
   a groove for the guide rail formed on a second housing,
   wherein the first housing and the second housing can engage each other and slide;
   an elastic body that expands and contracts in a longitudinal direction of the guide rail in parallel with the guide rail, and two pressing members that are located on both ends of the elastic body and subjected to respective opposite pressing forces from the elastic body, are provided in the groove for the guide rail;
   at least one-by-one notch is formed on each elastic-body-disposed side of the guide rail and the groove for the guide rail in such a position that the notches can be opposed to each other in a sliding action process; and
   the two pressing members can take such positions that the pressing members press respective different housings in opposite directions through the notches, so that the pressing members can rotate within the notches and thereby change their angles by a position where the notches are opposed to each other in the sliding action process, and thereby press different housings from then on.

2. The sliding structure according to claim 1, wherein each pressing member comprises a first pressing portion that transfers a pressing force of the elastic body to a notch on a side of the guide rail when the pressing member is at a first angle, and a second pressing portion that transfers the pressing force of the elastic body to a notch on a side of the groove for the guide rail when the pressing member is at a second angle.

3. The sliding structure according to claim 1, wherein a shaft body to be inserted through the elastic body and the pressing members is provided in the groove for the guide rail, and each pressing member comprises an insertion hole that allows the shaft body to pass therethrough but does not allow the elastic body to pass therethrough.

4. The sliding structure according to claim 3, wherein the insertion hole of the pressing members has an elliptic shape.

5. The sliding structure according to claim 1, wherein one notch is formed in the guide rail and two notches are formed in the groove for the guide rail.

6. The sliding structure according to claim 1, wherein two notches are formed in the guide rail and one notch is formed in the groove for the guide rail.

7. The sliding structure according to claim 1, wherein two notches are formed in each of the guide rail and the groove for the guide rail.

8. The sliding structure according to claim 7, wherein the two notches are formed in each of the guide rail and the groove for the guide rail at the same interval.

9. The sliding structure according to claim 7, wherein the two notches are formed in each of the guide rail and the groove for the guide rail at different intervals.

10. The sliding structure according to claim 1, wherein the guide rail contains a curved line portion.

11. A sliding opening-and-closing housing comprising a sliding structure for a housing according to claim 1.

12. A sliding opening-and-closing housing comprising two sliding structures for a housing according to claim 1, the two sliding structures for a housing being arranged in parallel.

13. A mobile phone comprising two sliding structures for a housing according to claim 1, the two sliding structures for a housing being arranged in parallel.

14. A sliding structure for a housing of a mobile phone comprises an elastic body and two pressing members in a groove for a guide rail, the groove being formed with a first housing and a second housing,
   wherein the elastic body expands and contracts in a longitudinal direction of the groove in parallel with the groove;
   the two pressing members are located on both ends of the elastic body and subjected to respective opposite pressing forces from the elastic body;
   at least one-by-one notch is formed on the groove side of the first housing and the second housing in such a position that the notches can be opposed to each other in a sliding action process; and the two pressing members can take such positions that the two pressing members press respective different housings in opposite directions through the notches, so that the pressing members can rotate within the notches and thereby change their angles by a position where the notches are opposed to each other in the sliding action process, and thereby press different housings from then on.

15. The sliding structure according to claim 14, wherein the guide rail contains a curved line portion.

* * * * *